United States Patent [19]
Yanadori et al.

[11] Patent Number: 4,561,493
[45] Date of Patent: Dec. 31, 1985

[54] HEAT-STORING APPARATUS

[75] Inventors: Michio Yanadori, Hachioji; Seigo Miyamoto, Takahagi; Keiichi Koike, Matsudo, all of Japan

[73] Assignee: Hitachi, Ltd., Tokyo, Japan

[21] Appl. No.: 416,276

[22] Filed: Sep. 9, 1982

[30] Foreign Application Priority Data

Sep. 11, 1981 [JP] Japan ............................... 56-142305
Jul. 30, 1982 [JP] Japan ............................... 57-131919

[51] Int. Cl.⁴ .......................................... F28D 17/00
[52] U.S. Cl. ............................... 165/10; 165/104.11; 252/70
[58] Field of Search ............... 165/104.11, 10; 252/70

[56] References Cited

U.S. PATENT DOCUMENTS

| | | | |
|---|---|---|---|
| 4,154,292 | 5/1979 | Herrick | 165/10 |
| 4,332,690 | 6/1982 | Kimura et al. | 165/10 |

FOREIGN PATENT DOCUMENTS

| | | | |
|---|---|---|---|
| 22460 | 6/1977 | Japan | 165/10 |
| 96854 | 7/1980 | Japan | 165/10 |

*Primary Examiner*—Albert W. Davis, Jr.
*Attorney, Agent, or Firm*—Antonelli, Terry & Wands

[57] ABSTRACT

A heat-storing vessel filled with a heat-storing material of latent heat type is provided with a fluid flow passage in thermal contact with the heat-storing material for passing a fluid for storing and releasing heat. By passing a hot fluid through the fluid flow passage, the heat-storing material in the heat-storing vessel is melted to store heat. By passing a cold fluid through the fluid flow passage, the heat-storing material in the heat-storing vessel is solidified to release heat. The heat-storing material contains a gelling agent to suppress a phase separation phenomenon. A low temperature part is provided at a part of the heat-storing vessel and the heat-storing material containing the gelling agent is retained in a solid state at the low temperature part to prevent supercooling of the heat-storing material.

20 Claims, 18 Drawing Figures

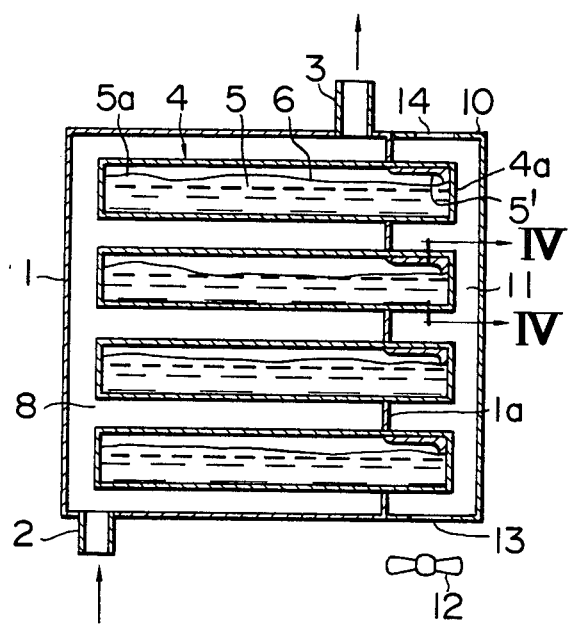
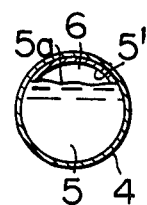
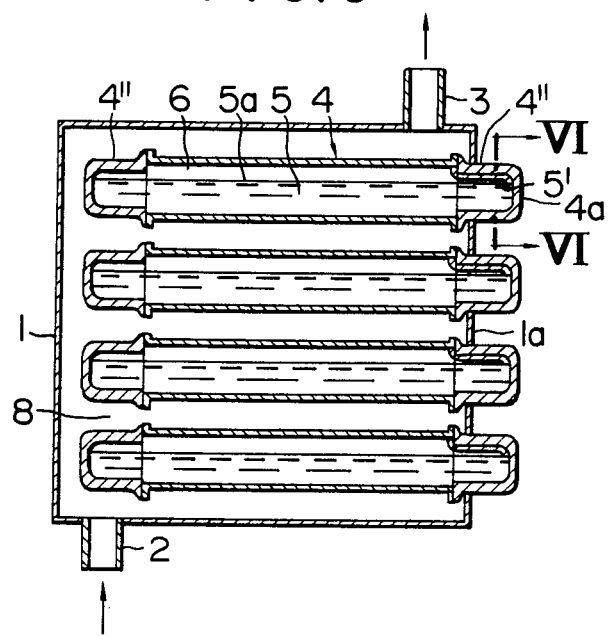
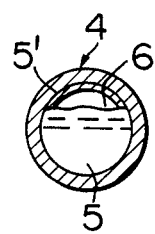

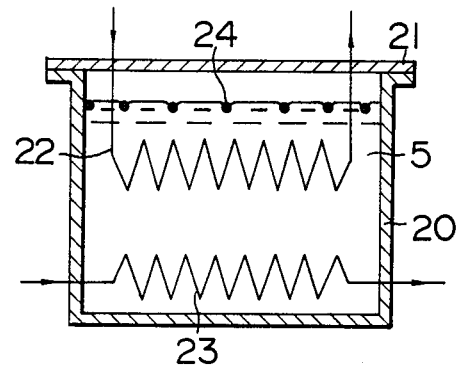
F I G. 16
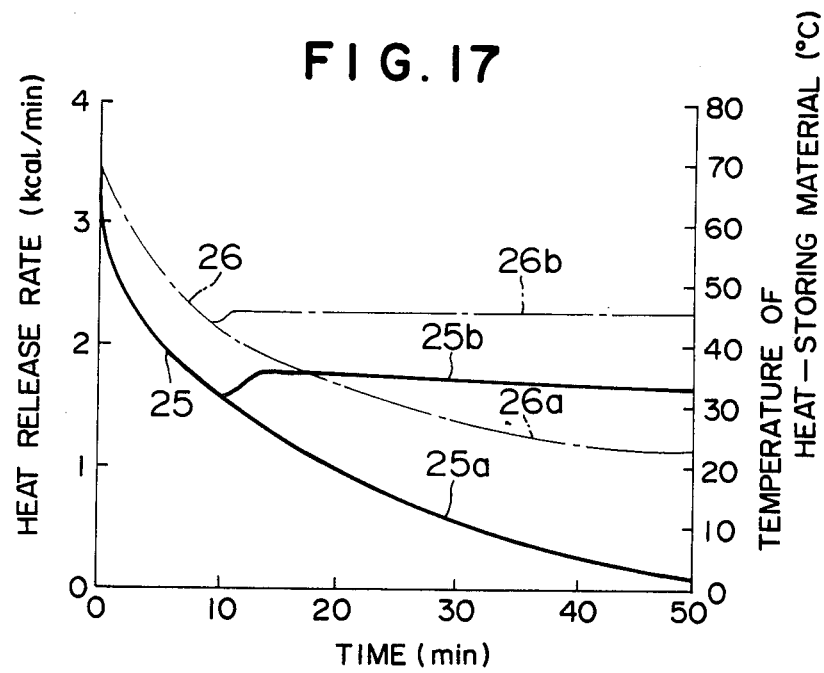
F I G. 17
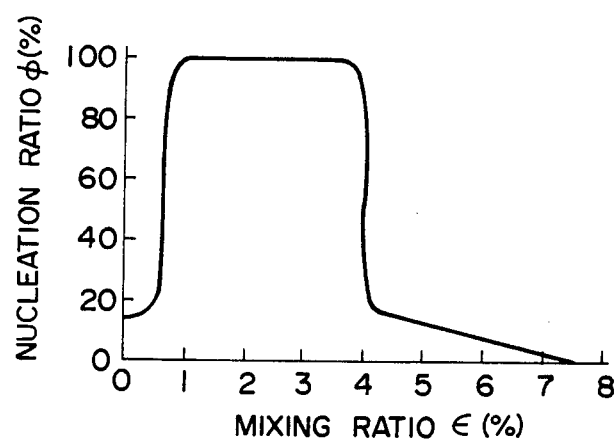
F I G. 18

HEAT-STORING APPARATUS

THE BACKGROUND OF THE INVENTION

1. The Field of the Invention

This invention relates to a heat-storing apparatus, which comprises a heat-storing material of latent heat type placed in a heat-storing vessel, where heat is stored or released by a phase change of the heat-storing material of latent heat type, and more particularly to a heat-storing apparatus, which stores solar heat, waste heat, heat generated by use of midnight electric power, etc. and releases the stored heat, when required.

2. The Prior Art

The conventional heat-storing apparatus uses a heat storing material of sensible heat type such as water, stone fragments, etc. as a heat-storing material, but such heat-storing material has a low heat-storing capacity, so that the heat-storing apparatus must have a considerably large size. Thus, attempts have been recently made to make the heat-storing apparatus smaller in size but larger in capacity by using a heat-storing material of latent heat type which utilizes the latent heat appearing at solidification and melting of inorganic hydrated salts such as sodium thiosulfate pentahydrate and calcium chloride hexahydrate. Various inorganic hydrated salts are available for desired temperature ranges, and for a temperature range of 40° to 50° C., sodium thiosulfate pentahydrate ($Na_2S_2O_3 \cdot 5H_2O$) is a promising heat-storing material because it has a melting point of 48° C., a solidification point of 45° C. and a high latent heat such as 82 cal/cm$^3$, and is also cheap. However, when the inorganic hydrated salts are subjected to repetitions of solidification and melting, a phenomenon of separating the salt into a salt having a high melting point and a salt having a low melting point (phase separation phenomenon) takes place due to the nature of the salt, that is, the melting point corresponding to a peritectic point, and consequently the salt will not release the latent heat at the desired temperature (melting point) in the end.

Sometimes, the salt undergoes supercooling and fails to undergo solidification at a temperature by 20° to 30° C. lower than the melting point and thus the stored heat is not released at the desired temperature (supercooling phenomenon).

SUMMARY OF THE INVENTION

An object of the present invention is to provide a heat-storing apparatus free from a phase separation phenomenon and a supercooling phenomenon.

According to the present invention, a heat-storing apparatus is provided, which comprises a heat-storing material containing a gelling agent being placed in a heat-storing vessel, a low temperature section being provided at a part of the heat-storing vessel, and the heat-storing material containing the gelling agent being provided in a solid state in the low temperature section.

BRIEF DESCRIPTION OF THE DRAWINGS

FIG. 3 is a cross-sectional view illustrating another embodiment of a heat-storing apparatus according to the present invention.

FIG. 4 is a cross-sectional view along the line IV—IV of FIG. 3.

FIG. 5 is a cross-sectional view illustrating further embodiment of a heat-storing apparatus according to the present invention.

FIG. 6 is a cross-sectional view along the line VI—VI of FIG. 5.

FIG. 16 is a view illustrating the structure of a testing apparatus for investigating effects of a heat-storing material in a heat-storing apparatus according to the present invention.

FIG. 17 is a diagram showing the test results obtained with the testing apparatus of FIG. 16.

FIG. 18 is a diagram showing relations between the mixing ratio of starch as a gelling agent and the nucleation ratio in one embodiment of a heat-storing material for use in a heat-storing apparatus according to the present invention.

DETAILED DESCRIPTION OF THE INVENTION

Figure 1:
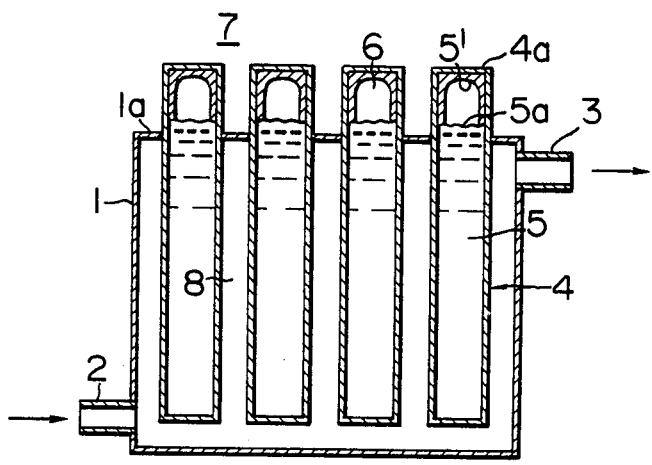
FIG. 1 is a cross-sectional view illustrating one embodiment of a heat-storing apparatus according to the present invention.

In FIG. 1, one embodiment of a heat-storing apparatus according to the present invention is shown, where a housing 1 is provided with a fluid inlet pipe 2 at the lower part and a fluid outlet pipe 3 at the upper part, and further with a plurality of heat-storing vessels 4 of polyethylene, copper, aluminum, or the like therein in a vertical state. Each of the heat-storing vessels 4 is filled with a heat-storing material 5 of latent heat type comprising sodium thiosulfate pentahydrate or calcium chloride hexahydrate as the main component. The heat-storing material 5 undergoes volume change at the solidification and melting, and thus there must be a small space in the heat-storing vessel 4 when filled with the heat-storing material 5. It is also preferable that the liquid surface 5a of heat-storing material 5 is a little higher than the level of wall 1a of housing 1. Furthermore, one end of heat-storing vessel 4 is projected from the wall 1a of housing 1 to come in contact with a low temperature fluid 7 i.e. air, and thus is at a lower temperature than the melting point of heat-storing material 5 in the heat-storing vessel 4. The outwardly projected part will be hereinafter referred to as "low temperature part 4a".

The heat-storing material 5' is deposited on the inner wall of low temperature part 4a of heat-storing vessel 4, i.e. inner wall in the space 6 of heat-storing vessel 4.

A fluid, i.e. water, oil, air or the like is introduced into the housing 1 through the fluid inlet pipe 2 to pass through the space 8 in the housing 1 and then is withdrawn therefrom to the outside through the fluid outlet pipe 3. When the temperature of the fluid is higher than the melting point of heat-storing material 5, 5', heat is transferred to the heat-storing material 5 from the fluid through the heat-storing vessels 4 to melt the heat-storing material 5, and is stored therein.

When the temperature of the fluid is lower than the melting point of heat-storing material 5, heat is transferred to the fluid from the heat-storing material 5 through the heat-storing vessels 4 to solidify the heat-storing material 5, and is released.

When the heat-storing material 5 undergoes repetitions of such heat cycle, a phase separation phenomenon gradually appears, so that it is separated into materials having different melting points. That is, a material having a high melting point deposits as a lower layer in the heat-storing vessel 5 and a material having a low melting point as an upper layer, so that no phase change occurs at the desired tempererature.

Figure 2:
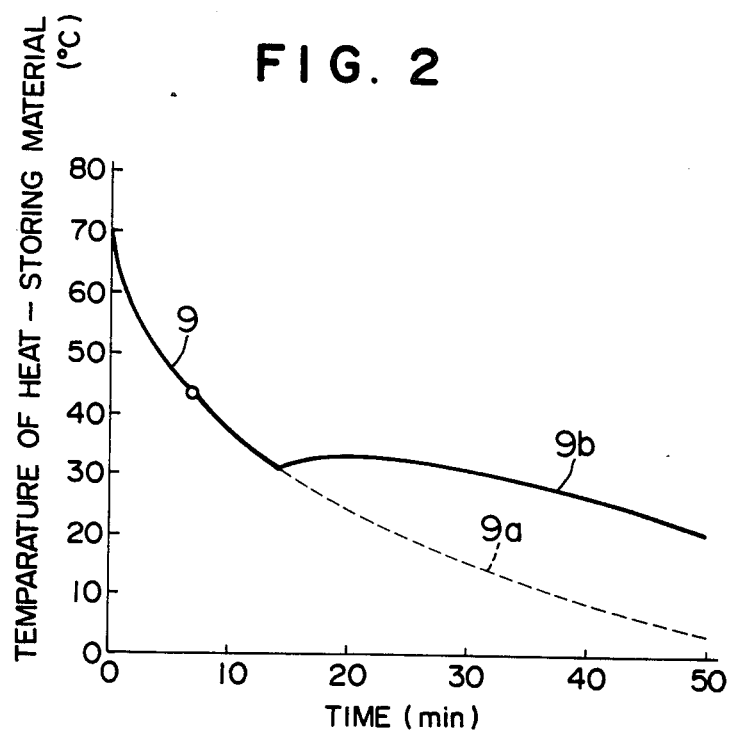
FIG. 2 is a diagram illustrating a phase separation phenomenon of a heat-storing material for use in a heat-storing apparatus.

In FIG. 2, heat-releasing characteristics of sodium thiosulfate pentahydrate as a heat-storing material after several ten repetitions of heating-cooling cycle are shown, where the time (minute) from the start of heat release is plotted on the axis of abscissa, and the temperature (°C.) of the heat-storing material is plotted on the axis of ordinate. Curve 9 shows a temperature change of heat-storing material. In the lower layer in the heat-storing vessel 5 sodium thiosulfate dihydrate having a high melting point deposits, as shown by dotted line 9a, so that no phase change takes place and thus there is no region of small temperature change at the solidification. In the upper layer in the heat-storing vessel 5 a material that undergoes phase change at a lower temperature, for example, 32° C., than the solidification point 45° C. of sodium thiosulfate pentahydrate deposits, as shown by full line 9b. The round mark "O" on the curve 9 shows the solidification point of sodium thiosulfate pentahydrate.

To suppress occurrence of the phase separation phenomenon, a gelling agent such as starch, gelatin, glass powder, alumina powder, etc. is added to the heat-storing material 5 according to the present invention. The gelling agent is also added to the heat-storing material deposited on the inner wall of the low temperature part 4a in the heat-storing vessel 4 (the inner wall in the space 6 in the heat-storing vessel 4).

For example, starch as a gelling agent is hygroscopic particles having particle sizes of 0.002 to 0.2 mm and is not soluble in cold water but swells in warm water so that the surrounding films of starch particles are broken to allow the starch substance to flow into the warm water and to turn it to a viscous liquid. The surrounding films of starch particles are broken at a temperature of 55° to 70° C., whereas the melting point of sodium thiosulfate pentahydrate is 48° C., and the application temperature range of heat-storing material is 20° to 70° C.

That is, a viscous mixture prepared by adding starch to sodium thiosulfate pentahydrate is in a very suitable temperature range. The starch turns colloid by liquefaction to a viscous state, and the resulting viscous starch colloid encloses sodium thiosulfate pentahydrate to suppress occurrence of the phase separation phenomenon.

In the structure shown in FIG. 1, the vicinity of low temperature part 4a in the heat-storing vessel 4 is at a lower temperature than the melting point of heat-storing material 5, and thus the heat-storing material 5' containing the gelling agent deposited on the inner wall of low temperature part 4a and the vicinity of the liquid surface 5a of heat-storing material 5 is solidified. When the heat-storing material 5 releases heat, crystals grow around the solidified parts without any supercooling.

Furthermore, the heat-storing material 5 contains the gelling agent, and thus occurrence of phase separation phenomenon of separating the heat-storing material into a material having a high melting point and a material having a low melting point can be suppressed. The heat-storing material 5' on the inner wall of low temperature part 4a contains the gelling agent, where the gelling agent in the heat-storing material 5' works as a kind of paste at the deposition and solidification, so that the heat-storing material 5' is secured to the inner wall of low temperature part 4a without peeling off to fall down.

In FIG. 3, another embodiment of a heat-storing apparatus according to the present invention is shown, and in FIG. 4, a cross-sectional view along line IV—IV of FIG. 3 is shown. According to this embodiment, heat-storing vessels 4 are horizontally arranged in the housing 1, where the heat-storing material 5' containing a gelling agent is also deposited and solidified on the inner wall of low temperature part 4a in the heat-storing vessels 4. In the present embodiment, a cover 10 is provided over the low temperature parts 4a of the heat-storing vessels 4 to form a fluid passage 11 between the wall 1c of housing 1 and the cover 10. Air as a fluid is forced to enter the fluid passage 11 by a fan 12 through an inlet 13 and vented through an outlet 14. The low temperature parts 4a of heat-storing vessels 4 are much more cooled than by spontaneous cooling according to the embodiment of FIG. 1. For much better cooling, the fluid passage 11 is made liquid-tight, and water is forced to enter the fluid passage 11 by a pump to cool the low temperature parts 4a of heat-storing vessels 4.

In FIG. 5, still another embodiment of a heat-storing apparatus according to the present invention is shown and in FIG. 6 a cross-sectional view along line VI—VI of FIG. 5 is shown. This embodiment differs in the shape of heat-storing vessel 4 from the foregoing embodiment. A heat-storing vessel 4 consists of a pipe part 4' and cap parts 4" welded to both ends of pipe part 4'. It is preferable that the cap parts 4" have a larger thickness than that of the pipe part 4', because the heat of a fluid having a high temperature is hard to transfer to the heat-storing material 5' deposited and solidified on the inner wall of cap parts 4" when the fluid is allowed to pass through the space 8 in the housing 1, so that the heat-storing material 5' will not be molten.

In FIGS. 7 to 13, heat-storing vessel sections of still other embodiments of heat-storing apparatuses according to the present invention are shown.

Figure 7:
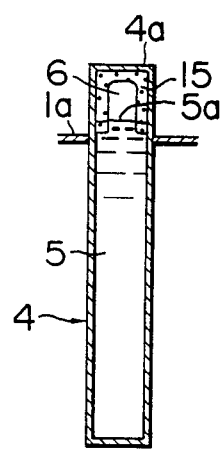
FIGS. 7–12 are cross-sectional views illustrating heat-storing vessel sections of still further embodiments of a heat-storing apparatus according to the present invention.

According to the embodiment of FIG. 7, the inner wall of low temperature part 4a in the heat-storing vessel is lined with a porous material 15 of glass wool, Moltopren (trademark of polymethane foam made by Bayer, Germany), metal fibers, metal nettings, sintered metal, or the like, and then the porous material 15 is impregnated with a heat-storing material containing a gelling agent, and solidified. In this case, it is preferable to extend a part of the porous material 15 downwards across the liquid surface 5a of the heat-storing material 5 to dip therein. With this structure the heat-storing material containing the gelling agent is firmly secured to the inner wall of low temperature part 4a in the heat-storing vessel 4.

Figure 8:
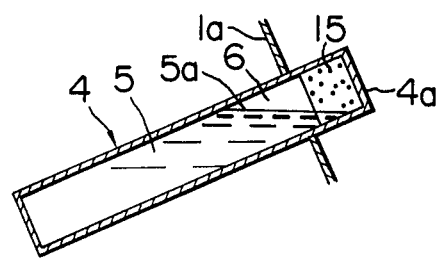

According to the embodiment of FIG. 8, a heat-storing vessel 4 is inclined, and a block of porous material 15 is impregnated with a heat-storing material containing a gelling agent.

Figure 9:
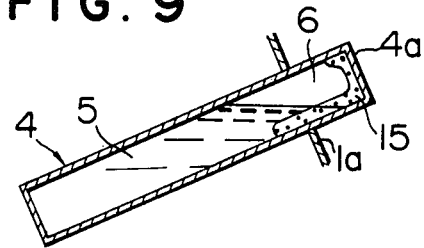

According to the embodiment of FIG. 9, one end of porous material 15 is further extended downwards across the liquid surface 5a of heat-storing material 5 to dip therein.

Figure 10:
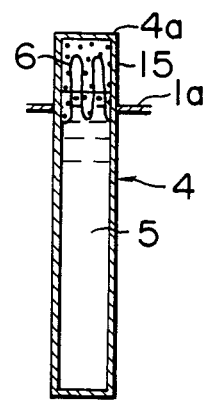
Figure 11:
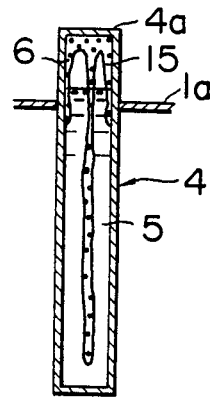

According to the embodiments of FIGS. 10 and 11, the inner wall of low temperature part 4a in the heat-storing vessel 4 is lined with a porous material 15 and at the same time, a porous material is provided at the center of space 6 in the heat-storing vessel 4 so that its tip end can be dipped in the heat-storing material 5. According to the embodiment of FIG. 10, the tip end extends to the vicinity of liquid surface 5a of heat-storing material 5, whereas according to the embodiment of FIG. 11, the tip end extends deeply through the heat-storing material 5 to the vicinity of the bottom of heat-storing vessel 4. With these structures, the surface tension of heat-storing material 5 is increased, and the heat-storing material 5 is pulled upwards by the capillary force of porous material 15, so that the heat-storing material containing a gelling agent can be retained in all the porous material 15 in the space 4a in the heat-storing vessel 4.

Figure 12:
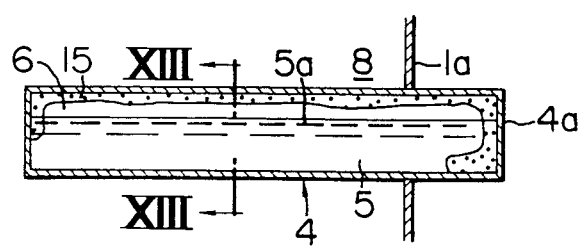
Figure 13:
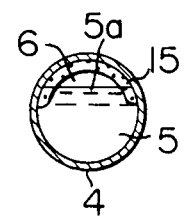
FIG. 13 is a cross-sectional view along the line XIII—XIII of FIG. 12.

In FIG. 12, still another embodiment of a heat-storing apparatus according to the present invention is shown, and in FIG. 13 a cross-sectional view along the line XII—XIII of FIG. 12 is shown. A heat-storing vessel 14 is horizontally arranged, and the space 6 of heat-storing vessel 4 not only exists at the low temperature part 4a, but also horizontally extends in the space in the heat-storing vessel 4 at the left side of wall surface 1a of housing 1 (high temperature part). The porous material 15 is secured to all or parts of the upper wall in the space 6 in the heat-storing vessel 4. With such a structure, the heat-storing material existing in the porous material 15 lined on the inner wall of heat-storing vessel at the space side 8 of housing 1 can melt when a high temperature fluid passes through the space 8 of housing 1, whereas the porous material 15 at the low temperature side 4a in the heat-storing vessel 4 can keep to retain the heat-storing material containing the gelling agent by the capillary force.

Figure 14:
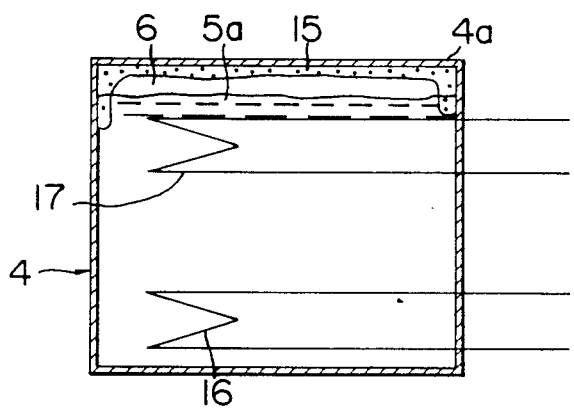
FIGS. 14 and 15 are cross-sectional views illustrating heat-storing vessel sections according to still further embodiments of a heat-storing apparatus according to the present invention.
Figure 15:
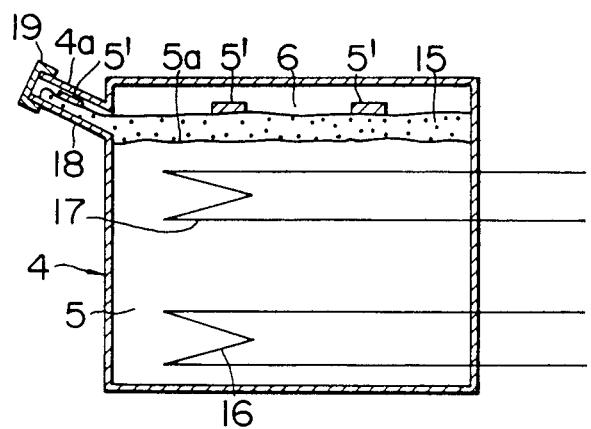

In FIGS. 14 and 15, still further embodiments of heat-storing apparatuses according to the present invention are shown, which are to store or release heat by means of heater 16 and cooler 17 provided in the heat-storing material 5 in a large heat-storing vessel 4 as being different from the embodiments shown in FIGS. 1-13. That is, the heat-storing material 5 is made to melt and store heat by passing a high temperature fluid through the heater 16, and is also made to release heat by passing a low temperature fluid through the cooler 17 while solidifying the heat-storing material 5.

According to the embodiment of FIG. 14, the low temperature part 4a in the heat-storing vessel 4 is lined with the porous material 15, and its function and effect are the same as those of the structure of FIG. 7 or FIG. 12.

According to the embodiment of FIG. 15, a small pipe 18 is projected from the heat-storing vessel 4 at one side, and the projected end of small pipe 18 is sealed with a cap 19. Porous material 15 is placed on the liquid surface 5a of heat-storing material 5 and one end of the porous material 15 is extended into the small pipe 18. Other members are the same as in FIG. 14. In this embodiment, the small pipe 18 serves the low temperature part 4a in the heat-storing vessel 4. In this embodiment, nucleation is further assured by providing an appropriate number of a heat-storing material 5' containing a gelling agent in a solid state on the porous material 15 in the heat-storing vessel 4 and the small pipe 18.

In the embodiments of FIGS. 14 and 15, the housing that forms a fluid passage for storing or releasing heat can be omitted.

In the foregoing embodiments, the nucleation can be much more effectively attained and the super-cooling phenomenon can be more effectively suppressed by adding a nucleating agent that can facilitate nucleation to the heat-storing agent 5 containing the gelling agent, or to the heat-storing agent 5' containing the gelling agent deposited and solidifed on the inner wall of the low temperature part 4a in the heat-storing vessel 4 or to the porous material 15.

Generally, a phase change from a liquid phase to a solid phase can be divided into two stages, i.e. a stage of generating crystal nuclei and a stage of making the crystals to grow at the nuclei. A large energy is required for the generation of nuclei, and it is known that the supercooling phenomenon appears owing to the presence of a barrier to such energy. To prevent such supercooling, a nucleating agent is added thereto. It is also known that the nucleating agent should be insoluble in a liquid phase and have a small$^2$ interfacial energy with newly generated crystals on the interface and a nucleus size larger than a given critical radius ranging between 1 and 100 $\mu$m. It is also known that the crystals are more liable to grow on a crystal face of low molecular density, for example, facet 100 or 110 in a cubic system. It is also known that such nucleating agent having a marked nucleating effect includes, for example, barium hydroxide and strontium for hydroxide calcium hydroxide hexahydrate. However, neither barium hydroxide nor strontium hydroxide as an alkaline material is applicable to sodium thiosulfate, for sodium thiosulfate is decomposed at an alkaline side.

As a result of various experimental studies of a nucleating agent for sodium thiosulfate on such theoretical basis, it has been found that naphthalene has a remarkable nucleating action, as compared with other substances. Naphthalene has a low solubility in water (0.04 g in 100 g of water and less than 0.01 g in 100 g of sodium thiosulfate), can exist as nuclei in water, and has the same crystal form (monoclinic form) as sodium thiosulfate. From the viewpoint of said interfacial energy, it seems that the crystal of sodium thiosulfate pentahydrate is liable to grow on the naphthalene. Even a very small amount of the nucleating agent has some effect, but practically at least 0.01% by weight thereof must be added thereto on the basis of sodium thiosulfate. There is no upper limit thereto particularly in view of its function and effect, but a larger amount will reduce the heat-storing density, and thus a practical upper limit is about 10% by weight.

FIG. 16 shows a model of heat-storing apparatus built up for determining the effect of a nucleating agent, where numeral 20 is a heat-storing vessel, numeral 21 a lid, and sodium thiosulfate pentahydrate is placed as a heat-storing material 5 in a heat-storing vessel 20. A heater 22 and a cooler is dipped in the heat-storing material 5. Numeral 24 is a nucleating agent added to the heat-storing material 5. When sodium thiosulfate pentahydrate is used as the heat-storing material 5, a nucleating material 24 is preferably naphthalene. The nucleating material 24 has a smaller specific gravity than sodium thiosulfate (naphthalene has a specific gravity of 1.14 g/cm$^3$, whereas sodium thiosulfate has a specific gravity of 1.73 g/cm³), and thus floats on the heat-storing material.

In a test, hot water at 70° C. is passed through the heater 22 to uniformly heat the heat-storing material 5 at about 70° C., and then cold water at 20° C. is passed through the cooler 23.

FIG. 17 shows the test results, where the axis of abscissa shows time (min) from the start to pass cold water, whereas the axis of ordinate shows a heat release rate (Kcal/min) and the temperature (°C.) of heat-storing material 5 in the heat-storing vessel 20. In FIG. 17, a curve 25 of full line shows the heat release rate, whereas a curve 26 of alternate long and short dash line show the temperature of heat-storing material. When no naphthalene is added to sodium thiosulfate pentahydrate as the heat-storing material, no solidification takes place, even if the temperature of heat-storing material is lower than the solidification temperature of 45° C., as shown by curve 26a. That is, the temperature is continuously lowered. In that case, the heat release rate is also continuously lowered as shown by curve 25a, and reaches substantially zero after 50 minutes. On the other hand, when naphthalene is added thereto, supercooling by about 2° C. takes place, as shown by curve 26b, but the lowered temperature is soon recovered to a solidification temperature of 45° C. In that case, the heat release rate is kept substantially constant and higher than that of curve 25a after the start of solidification, as shown by curve 25b.

As described above, supercooling can be effectively prevented by addition of naphthalene as a nucleating agent when sodium thiosulfate is used as a heat-storing material, and the nucleation effect can be further increased by further addition of at least one of phthalic anhydride, fumaric acid, benzoic acid, chlorobenzoic acid, ammonium thiosulfate, and naphthol to naphthalene.

When sodium thiosulfate pentahydrate is used as a heat-storing material together with naphthalene as a nucleating agent and starch as a gelling agent for suppressing the phase separation phenomenon, starch turns into a colloidal state through liquefaction and the heat-storing material turns viscous material as described before, and encloses sodium thiosulfate pentahydrate to suppress the phase separation phenomenon. At the same time, starch encloses naphthalene to suppress such phenomena as floating of naphthalene as the upper layer in the heat-storing vessel or sublimation.

Tests were conducted by changing mixing ratios of starch to sodium thiosulfate pentahydrate, and it was found that there is an optimum mixing ratio. In a smaller mixing ratio of starch, the phase separation is liable to occur, whereas in a larger mixing ratio no substantial nucleation supercooling is liable to take place. Supercooling is liable to take place in a smaller mixing ratio of starch due to the fact that starch cannot enclose the naphthalene as the nucleating agent completely due to the smaller amount of starch, and the naphthalene tends to float or sublimate. No substantial nucleation takes place in a larger mixing ratio of starch due to the fact that a larger amount of starch inhibits contacting of naphthalene with sodium thiosulfate pentahydrate.

FIG. 18 shows the results of optimum mixing ratio of starch, where the axis of abscissa shows a mixing ratio $\epsilon(\%)$ and the axis of ordinate shows a nucleation ratio $\phi(\%)$. Nucleation ratio $\phi$ is a numerical value that represents how many times the solidification takes place at the specific temperature (solidification temperature: 45° C.) through several tens of repetitions of solidification-melting cycle. It is seen from FIG. 18 that the nucleation ratio $\phi$ is substantially 100% at a mixing ratio $\epsilon$ of 1 to 4% by weight. Above a mixing ratio of 4% by weight, the viscous mixture tends to take air bubbles in, and the air bubbles are retained therein even by repetitions of heating and cooling. The thermal conductivity of heat-storing material becomes very low in such a state, and it is hard to release the heat from the heat-storing material. Thus, it is preferable that the mixing ratio $\epsilon$ does not exceed 4% by weight. When starch is added to sodium thiosulfate pentahydrate, the heat-storing material turns viscous through liquefaction of starch, and separation into two phases can be prevented, but the viscosity of heat-storing material is increased. Thus, the convection hardly takes place when the heat-storing material stores the heat, and thus the heat resistance becomes large, so that it takes much time in heat storing. To overcome such trouble, it is preferable to add metallic fibers or metallic cutting powders to a heat-storing material. The metallic fibers also serve to enclose masses of naphthalene as a nucleating agent to prevent them from floating as an upper layer.

When naphthalene is added to the heat-storing material 5 as a nucleating agent in the heat-storing vessel with the porous material 15 provided on the inner wall at the low temperature part 4a, naphthalene undergoes sublimation through the heat cycle, and the sublimated naphthalene crystallizes porous material 15 on the inner wall at the low temperature part 4a in the heat-storing vessel 4. The crystals grow to a needle-like form and contact the liquid surface 5a of heat-storing material 5 to act again as the nucleating agent.

In the embodiments shown in FIGS. 14 and 15, sublimation of naphthalene can be prevented by the porous material 15 on the liquid surface 5a of heat-storing material 5 when naphthalene is added to the heat-storing material 5 as the nucleating agent, and the reduction of the nucleating effect can be prevented.

As described above, the phase separation phenomenon of heat-storing material can be suppressed, and supercooling can be prevented in the present invention, and thus heat storing and release can be effectively carried out.

What is claimed is:

1. In a heat-storing apparatus for storing and releasing heat by phase change of heat-storing material of latent heat type comprising a heat-storing vessel, and a heat-storing material of latent heat type filled in the heat-storing vessel, the improvement comprising the heat-storing material containing a gelling agent and a nucleating agent, a fluid flow passage being provided in the heat-storing vessel in thermal contact with the heat-storing material for passing a fluid for giving heat to the heat-storing material for heat-storing and for passing a fluid for withdrawing heat from the heat-storing material, a low temperature part having a lower temperature than another part being provided at a part of the heat-storing vessel, and the heat-storing material containing the gelling agent and nucleating agent being provided in a solid state at least at the inner wall of the low temperature part in the heat-storing vessel, and wherein the heat-storing material is sodium thiosulfate pentahydrate, and contains starch as the gelling agent and naphthalene as the nucleating agent.

2. The heat-storing apparatus according to claim 1, wherein 1 to 4% by weight of the starch is contained as the gelling agent.

3. The heat-storing apparatus according to claim 1, wherein the starch is in particulate form having particle sizes of 0.002 to 0.2 mm.

4. The heat-storing apparatus according to claim 1, wherein the heat-storing material contains at least 0.01% by weight of naphthalene on the basis of sodium thiosulfate.

5. The heat-storing apparatus according to claim 4, wherein the heat-storing material contains 0.01%–10% by weight of naphthalene on the basis of sodium thiosulfate.

6. The heat-storing apparatus according to claim 1, wherein the heat-storing material further includes a material selected from the group consisting of metallic fibers and metallic cutting powders.

7. In a heat-storing apparatus for storing and releasing heat by phase change of heat-storing material of latent heat type comprising a heat-storing vessel, and a heat-storing material of latent heat type filled in the heat-storing vessel, the improvement comprising the heat-storing material containing a gelling agent and nucleating agent, a fluid flow passage being provided in the heat-storing vessel in thermal contact with the heat-storing material for passing a fluid for giving heat to the heat-storing material for heat-storing, another fluid flow passage being provided in the heat-storing vessel in thermal contact with the heat-storing material for passing a fluid for withdrawing heat from the heat-storing material, a low temperature part having a lower temperature than another part being provided at a part of the heat-storing vessel, a porous material being provided at least at the low temperature part, and the heat-storing material containing the gelling agent and nucleating agent being provided in a solid state in the porous material, and wherein the heat-storing material is sodium thiosulfate pentahydrate, and contains starch as the gelling agent and naphthalene as the nucleating agent.

8. The heat-storing apparatus according to claim 7 wherein the heat-storing vessel is provided in a housing, a part of the heat-storing vessel is projected to the outside of the housing, the fluid flow passage for passing a fluid for giving heat to the heat-storing material for heat-storing and the fluid flow passage for withdrawing heat from the heat-storing material are formed between the heat-storing vessel and the housing, and the part of the heat-storing vessel projected from the housing is made the low temperature part.

9. The heat-storing apparatus according to claim 7, wherein pipe passages are provided in the heat-storing material in the heat-storing vessel, and made the fluid flow passage for passing a fluid for giving heat to the heat-storing material and the fluid flow passage for passing a fluid for withdrawing the heat from the heat-storing material.

10. The heat-storing apparatus according to claim 8, wherein the low temperature part of the heat-storing vessel projected from the wall of the housing is covered with a cover, thereby forming a passage for a low temperature fluid.

11. The heat-storing apparatus according to claim 8 or 10, wherein the heat-storing vessel comprises a pipe part and a cap part for sealing the end of the pipe part, and the cap part has a larger thickness than that of the pipe part.

12. The heat-storing apparatus according to claim 7, wherein a pipe part is provided in the vicinity of the liquid surface of the heat-storing material in the heat-storing vessel and made the low temperature part.

13. The heat-storing apparatus according to claim 12, wherein the porous material is provided at the pipe part and at the liquid surface of the heat-storing material, and the heat-storing material containing the gelling agent is provided in a solid state in the porous material.

14. The heat-storing apparatus according to claim 7, wherein the heat-storing material contains an additive to the nucleating agent.

15. The heat-storing apparatus according to claim 7, wherein the porous material is provided to line the inner wall of the low temperature part, and the porous material is impregnated with the heat-storing material containing the gelling agent and nucleating agent in a solid state, whereby the heat-storing material containing the gelling agent and nucleating agent is provided in a solid state at least at the inner wall of the low temperature part in the heat-storing vessel.

16. In a heat-storing apparatus for storing and releasing heat by phase change of heat-storing material of latent heat type comprising a heat-storing vessel, and a heat-storing material of latent heat type filled in the heat-storing vessel, the improvement comprising the heat-storing material containing a gelling agent, at least one fluid flow passage being provided in the heat-storing vessel in thermal contact with the heat-storing material for passing a fluid for giving heat to the heat-storing material for heat storing and for passing a fluid for withdrawing heat from the heat-storing material, a low temperature part having a lower temperature than another part being provided at a part of the heat-storing vessel, a porous material being provided at least at the low temperature part, the porous material being provided with the heat-storing material containing the gelling agent, whereby the heat-storing material containing the gelling agent is provided in a solid state at least at the low temperature part in the heat-storing vessel, wherein the heat-storing material contains a nucleating agent, and wherein the heat-storing material is sodium thiosulfate penfahydrate, and contains starch as the gelling agent and naphthalene is the nucleating agent.

17. The heat-storing apparatus according to claim 16, wherein 1 to 4% by weight of the starch is contained as the gelling agent.

18. In a heat-storing apparatus for storing and releasing heat by phase change of heat-storing material of latent heat type comprising a heat-storing vessel, and a heat-storing material of latent heat type filled in the heat-storing vessel, the improvement comprising the heat-storing material containing a gelling agent, at least one fluid flow passage being provided in the heat-storing vessel in thermal contact with the heat-storing material for passing a fluid for giving heat to the heat-storing material for heat storing and for passing a fluid for withdrawing heat from the heat-storing material, a low temperature part having a lower temperature than another part being provided at a part of the heat-storing vessel, a porous material being provided at least at the low temperature part, the porous material being provided with the heat-storing material containing the gelling agent, whereby the heat-storing material containing the gelling agent is provided in a solid state at least at the low temperature part in the heat-storing vessel, wherein the heat-storing material contains a nucleating agent and an additive to the nucleating agent, and wherein the heat-storing material is sodium thiosulfate pentahydrate and contains starch as the gelling starch agent, naphthalene as the nucleating agent, and at least one member selected from the group consisting of phthalic anhydride, fumaric acid, benzoic acid, chlorobenzoic, ammonium thiosulfate, and naphthol as the additive to the nucleating agent.

19. The heat-storing apparatus according to claim 18, wherein 1 to 4% by weight of the starch is contained as the gelling agent.

20. The heat-storing apparatus according to claim 18, wherein the additive is phthalic anhydride.

* * * * *